United States Patent
Liao et al.

(10) Patent No.: US 10,084,212 B2
(45) Date of Patent: Sep. 25, 2018

(54) BATTERY MODULE AND BATTERY SAFETY METHOD

(71) Applicant: Quanta Computer Inc., Taoyuan (TW)

(72) Inventors: Shun-Yung Liao, Taoyuan (TW);
Yu-An Huang, Taoyuan (TW);
Li-Sheng Chiou, Taoyuan (TW);
Chih-Chiang Wang, Taoyuan (TW);
Yu-Ti Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 451 days.

(21) Appl. No.: 14/920,841

(22) Filed: Oct. 22, 2015

(65) Prior Publication Data

US 2017/0047617 A1 Feb. 16, 2017

(30) Foreign Application Priority Data

Aug. 14, 2015 (TW) .............................. 104126600 A

(51) Int. Cl.
*H01M 10/42* (2006.01)
*H01M 10/44* (2006.01)

(52) U.S. Cl.
CPC ....... *H01M 10/4257* (2013.01); *H01M 10/44* (2013.01); *H01M 2010/4271* (2013.01)

(58) Field of Classification Search
CPC .. H01M 10/42; H01M 10/44; H01M 10/4257; H01M 6/50; H02J 7/00
See application file for complete search history.

(56) References Cited

U.S. PATENT DOCUMENTS

| | | | |
|---|---|---|---|
| 6,924,624 B2 | 8/2005 | Baur et al. | |
| 8,450,975 B2 | 5/2013 | Kim | |
| 9,203,249 B2 | 12/2015 | Noda et al. | |
| 2007/0257642 A1 | 11/2007 | Xiao et al. | |
| 2010/0194348 A1* | 8/2010 | Wang | H01M 10/42 320/136 |
| 2011/0057622 A1* | 3/2011 | Kim | H01M 10/425 320/137 |
| 2011/0304984 A1* | 12/2011 | McClure | G06F 1/1626 361/679.56 |
| 2013/0093242 A1 | 4/2013 | Mok et al. | |

FOREIGN PATENT DOCUMENTS

| | | |
|---|---|---|
| CN | 1268028 C | 8/2006 |
| CN | 101295881 A | 10/2008 |
| CN | 102013706 A | 4/2011 |
| CN | 102859830 A | 1/2013 |
| CN | 103869927 A | 6/2014 |
| TW | 200849766 A | 12/2008 |

* cited by examiner

*Primary Examiner* — Kenneth J Douyette
(74) *Attorney, Agent, or Firm* — McClure, Qualey & Rodack, LLP

(57) ABSTRACT

A battery module and a battery safety method are provided herein. The battery module includes at least one connection unit and a determining unit. The at least one connection unit is configured to be detachably and electrically connected to an electronic device. The determining unit is configured to determine whether the battery module is detached from the electronic device through the at least one connection unit. When determining that the battery module is detached from the electronic, the determining unit controls the battery module to enter a shipping mode.

6 Claims, 3 Drawing Sheets

BATTERY MODULE AND BATTERY SAFETY METHOD

RELATED APPLICATIONS

This application claims priority to Taiwan Application Serial Number 104126600, filed Aug. 14, 2015, which is herein incorporated by reference.

BACKGROUND

Field of Invention

The present invention relates to a battery technology. More particularly, the present invention relates to a battery module and a battery safety method.

Description of Related Art

Batteries are broadly used in electronic devices to provide a more flexible usage environment without being limited to ranges of power sockets and power wires. Generally, operation modes of a battery are classified as a normal mode and a power interrupt mode. The normal mode means that the battery supply power an electronic device, and the battery enters the power interrupt mode and stops outputting power when being detached from the electronic device. However, the battery that is originally in the power interrupt mode outputs power to the electronic device immediately after being mounted on the electronic device again, and thus a surge may be generated to damage the electronic device. Moreover, if the battery mounted on the electronic device continuously generates leakage current, additional battery power waste is caused.

SUMMARY

In order to improve operation safety and endurance of a battery, an aspect of the present disclosure provides a battery module. The battery module includes at least one connection unit and a determining unit. The at least one connection unit is configured to be detachably and electrically connected to an electronic device. The determining unit is configured to determine whether the battery module is detached from the electronic device through the at least one connection unit. When determining that the battery module is detached from the electronic device, the determining unit controls the battery module to enter a shipping mode.

Another aspect of the present disclosure provides a battery safety method includes the following steps. A battery module is determined whether to be detached from an electronic device through at least one connection unit of the battery module. The battery module is controlled to enter a shipping mode when it is determined that the battery module is detached from the electronic device. The at least one connection unit is configured to be detachably and electrically connected to the electronic device.

In sum, the present disclosure is directed to automatically entering a shipping mode which is power-saving and secure when a battery module of the present disclosure is detached from an electronic device, or be design to automatically enter the shipping mode after the battery module has been detached from an electronic device for a predetermined period of time, thereby handling various application situations through the above-mentioned embodiments. Therefore, the battery module of the present disclosure can effectively prevent damage to the electronic device caused by surge or improper battery mounting and also improve leakage current problem. Therefore, safety and endurance of the battery module in operation are improved.

It is to be understood that both the foregoing general description and the following detailed description are by examples, and are intended to provide further explanation of the invention as claimed.

BRIEF DESCRIPTION OF THE DRAWINGS

In order to make the aforementioned contents, and other purposes, features, advantages, and embodiments more clear and understandable, with description made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise.

In this document, the term "coupled" may also be termed as "electrically coupled", and the term "connected" may be termed as "electrically connected". "Coupled" and "connected" may also be used to indicate that two or more elements cooperate or interact with each other.

Figure 1:
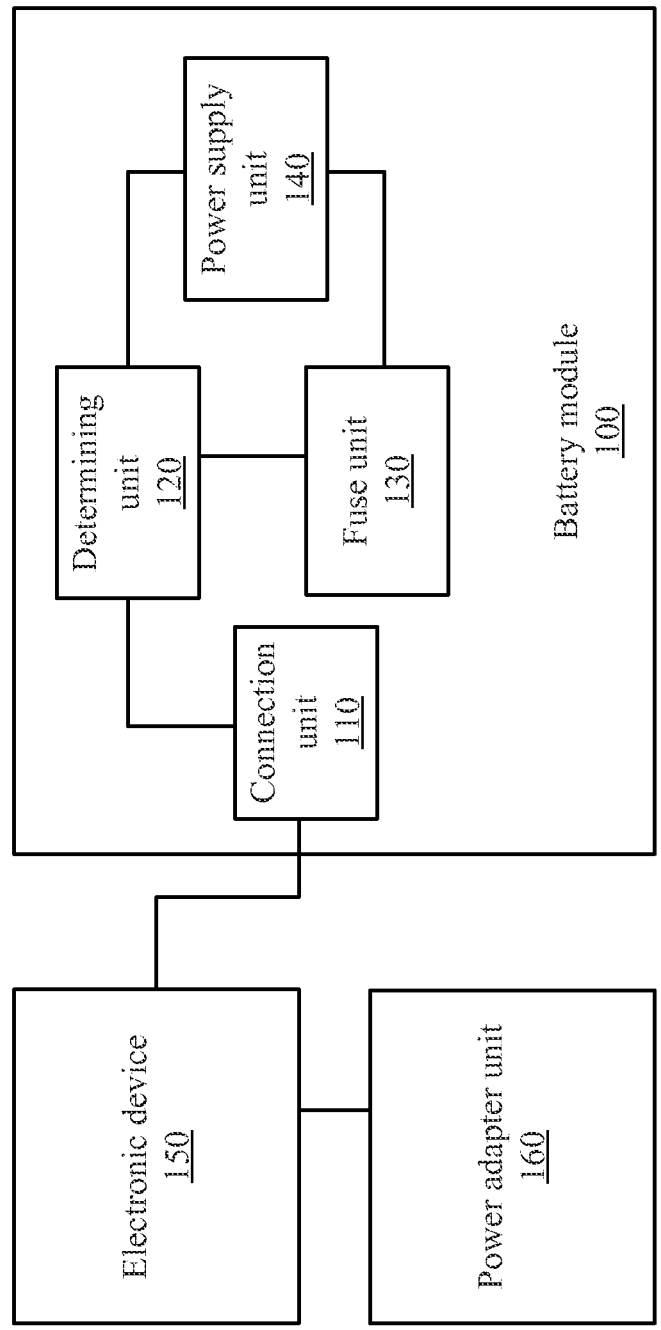
FIG. 1 is schematic diagram of a battery module according to an embodiment of the present disclosure.

FIG. 1 is schematic diagram of a battery module 100 according to an embodiment of the present disclosure. In practice, the battery module 100 can be used to store power, and provide power to the electronic device 150. In one embodiment, the electronic device 150 is a notebook, a cell phone, a tablet computer, a game machine, a translation machine, or various electronic devices. The battery module 100 is a demountable battery that is applicable to the aforementioned electronic device 150, but the present disclosure is not limit thereto.

The battery module 100 includes a connection unit 110 and a determining unit 120. The connection unit 110 is detachably and electrically connected to the electronic device 150. When the battery module 100 is mounted on the electronic device 150, the connection unit 110 is connected to the electronic device 150. The connection unit 110 can be a communication and power transmission interface between the battery module 100 and the electronic device 150. When the battery module 100 is detached from the electronic device 150, the connection unit 110 is separated from the electronic device 150. The determining unit 120 determines whether the battery module 100 is detached from the electronic device 150 through the connection unit 110. Specifically, the determining unit 120 determining whether the battery module 100 is detached from the electronic device 150 according to whether an electrical signal transmitted through the connection unit 110 meets a certain condition, thereby. For example, the aforementioned condition for the electrical signal can be set to a logic low level, a level lower than a specific voltage level, a single pulse or a specific pulse sequence, but the present disclosure is not limit thereto. When the determining unit 120 determines that the battery module 100 is detached from the electronic device 150, the determining unit 120 controls the battery module 100 to enter a shipping mode.

The battery module 100 that enters the shipping mode stops providing power, and the determining unit 120 inside the battery module 100 is also in a turn-off state or a sleep state at which operation is stopped, thus reducing extra power waste to improve operation endurance of the battery module 100. In the present disclosure, when the battery module 100 that enters the shipping mode is mounted on the electronic device 150 again, the battery module 100 does not provide power to the electronic device 150 immediately, so as to effectively prevent damage to the electronic device 150 caused by surge. In comparison, in the prior art, when a battery that enters a power interrupt mode is mounted on the electronic device, the battery provides power to the electronic device immediately, and thus surge is likely to be caused and damages the electronic device. Therefore, the battery module 100 of the present disclosure can improve operation safety and endurance of the battery.

Moreover, because the battery module 100 of the present disclosure is controlled to enter the shipping mode by the determining unit 120 located therein, the battery module 100 can automatically enter the shipping mode, without needing to turn on and operate the electronic device 150 by an operator to send a command to the battery module 100 from an external program to make the battery module 100 to enter the shipping mode. Therefore, the battery module 100 of the present disclosure also improves application convenience.

In another embodiment, in order to improve the accuracy of determining whether the battery module 100 is detached from the electronic device 150, several connection units 110 are used as a determination basis for the determining unit 120. For example, respective electrical signals on the corresponding connection units 110 can be the same or different, and the same condition or different conditions can be set correspondingly to determine whether the battery module 100 is detached from the electronic device 150. A determination method used by the determining unit 120 is similar to that described above, and is not repeated herein. The increased number of the connection unit 110 can be used to set a more strict condition for determining whether the battery module is detached, thus reducing misjudgment probability of the determining unit 120, improving its judgment accuracy. For example, if all of the electrical signals on the connection unit 110 have determined that the battery module 100 is detached from the electronic device 150 by the determining unit 120, it will be more accurate than that only one electrical signal on the corresponding connection unit 110 determines that the battery module 100 is not detached from the electronic device 150. If the accuracy is greater than a predetermined range (for example, all of the electrical signals all have determined that the battery module has been detached), the determining unit 120 determines that the battery module 100 is already detached from the electronic device 150.

In a specific embodiment, the connection unit 110 can be a pin on the battery module 100, such as an enable pin or a clock pin. In a specific embodiment, the determining unit 120 can be implemented as an integrated circuit (IC) or a chip, such a gauge IC. Functions of the gauge IC include detecting an operation status and remaining capacity of the battery module 100, and accordingly calculating remaining usage time and charge time of the battery module 100. In a specific embodiment, when the battery module 100 enters the shipping mode, the gauge IC also stops operation of (including detecting the operation status and remaining capacity of the battery module 100), and thus power consumption of the battery module 100 can be effectively reduced.

As described before, the battery module 100 that enters the shipping mode stops the function of supplying power, and the determining unit 120 is also in a turn-off state or a sleep mode at which operation is stopped. Even when the battery module 100 is mounted on the electronic device 150, the battery module 100 and the determining unit 120 still remain in the turn-off state or the sleep state to avoid generating surge. In order to release the battery module 100 from the shipping mode and restore the function of supplying power, in one embodiment, when the battery module 100 that enters the shipping mode is mounted on the electronic device 150 and the electronic device 150 stably receives power, the determining unit 120 restores operation and releases the battery module 100 from the shipping mode. In one embodiment, the aforementioned manner of stably supplying power to the electronic device 150 can be provided through a power adapter unit 160 (such as a power adapter), but the present disclosure is not limit thereto. It should be noted that the power adapter unit 160 and the battery module 100 are different electronic units or components.

In another specific embodiment, as shown in FIG. 1, the battery module 100 further includes a fuse unit 130 and a power supply unit 140. When over voltage or surge occurs, the fuse unit 130 can protect the battery module 100 from being damaged. For example, the fuse unit 130 may be a fuse or another protective device. The power supply unit 140 is configured to provide power for operating the determining unit 120. For example, the power supply unit 140 may be a rechargeable battery or another electric power storage component. The fuse unit 130 and the power supply unit 140 are merely considered as an illustrative embodiment of battery module 100 in the present disclosure, and do not intend to limit the present disclosure.

In a further embodiment, when the determining unit 120 determines that the battery module 100 is detached from the electronic device 150, the determining unit 120 starts to count a time value. When the counted time value is greater than a predetermined time value, the determining unit 120 controls the battery module 100 to enter the shipping mode. In other words, when the battery module 100 is detached from the electronic device 150, there is a period of buffer time (i.e., the predetermined time value, such as 10 seconds) for the determining unit 120 to determine whether to control the battery module 100 to enter the shipping mode.

Therefore, the battery module 100 of the present disclosure can flexibly design the time point of entering the shipping mode, so as to handle various application situations. For example, a battery module 100 completely fabricated only needs to be detached from the electronic device 150 before shipping out, and the battery module 100 can automatically enter a power-saving and secure shipping mode immediately or after a predetermined period of time, without needing to turn on and operate the electronic device 150 by the operator to send a command from an external program to the battery module 100 to make the battery module 100 enter the shipping mode. The battery module 100 can automatically enters the shipping mode simply through a single demounting action. Moreover, the battery module 100 that enters the shipping mode can reduce power consumption effectively, which is helpful for distributing and delivering process of the battery module 100.

Figure 2:
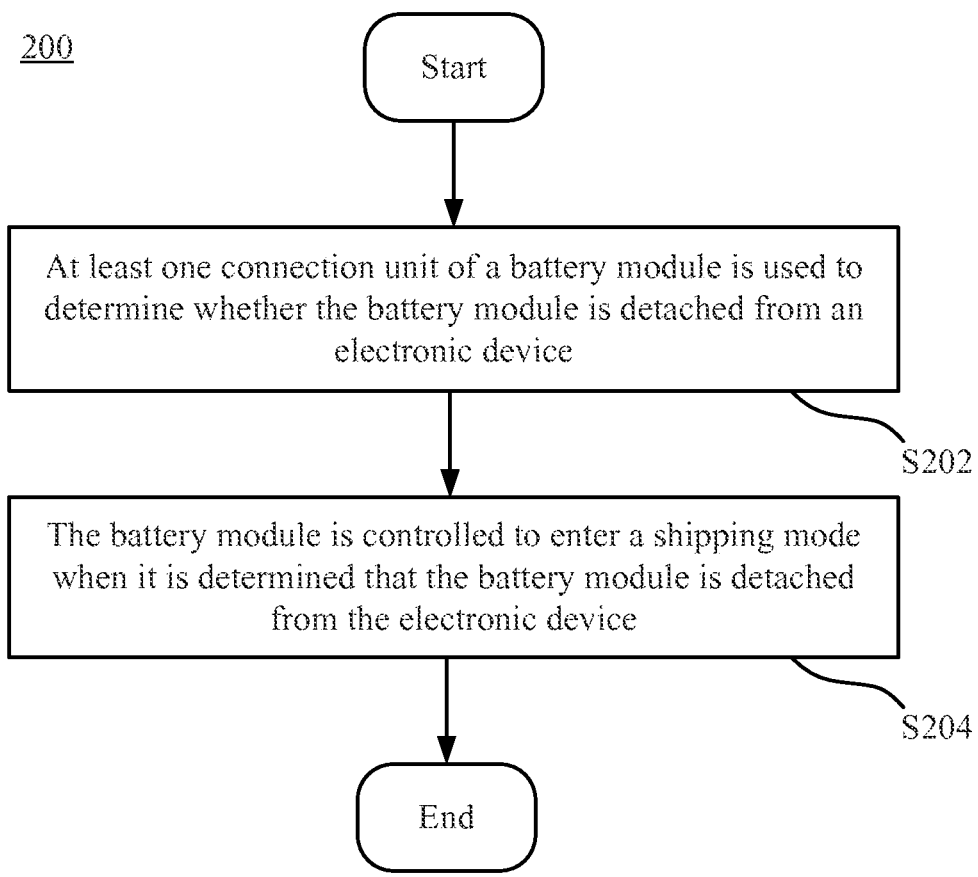
FIG. 2 is a flow chart of a battery safety method according to an embodiment of the present disclosure.

FIG. 2 is a flow chart of a battery safety method 200 according to an embodiment of the present disclosure. The battery safety method 200 includes steps S202-S204 and is applicable to the battery module 100 in shown in FIG. 1. However, those skilled in the art should understand that the steps in the present embodiment are in an adjustable execution sequence according to actual demands except for the steps in a specifically described sequence, and even the steps or parts of the steps can be executed simultaneously.

First, in step S202, at least one connection unit of a battery module is used to determine whether the battery module is detached from an electronic device. In step S204, the battery module is controlled to enter a shipping mode when it is determined that the battery module is detached from the electronic device. Implementation of the connection unit, conditions for determining whether the battery module is detached and conditions for controlling the battery module to enter the shipping mode are described with details in the above embodiments, and are not repeated herein.

Figure 3:
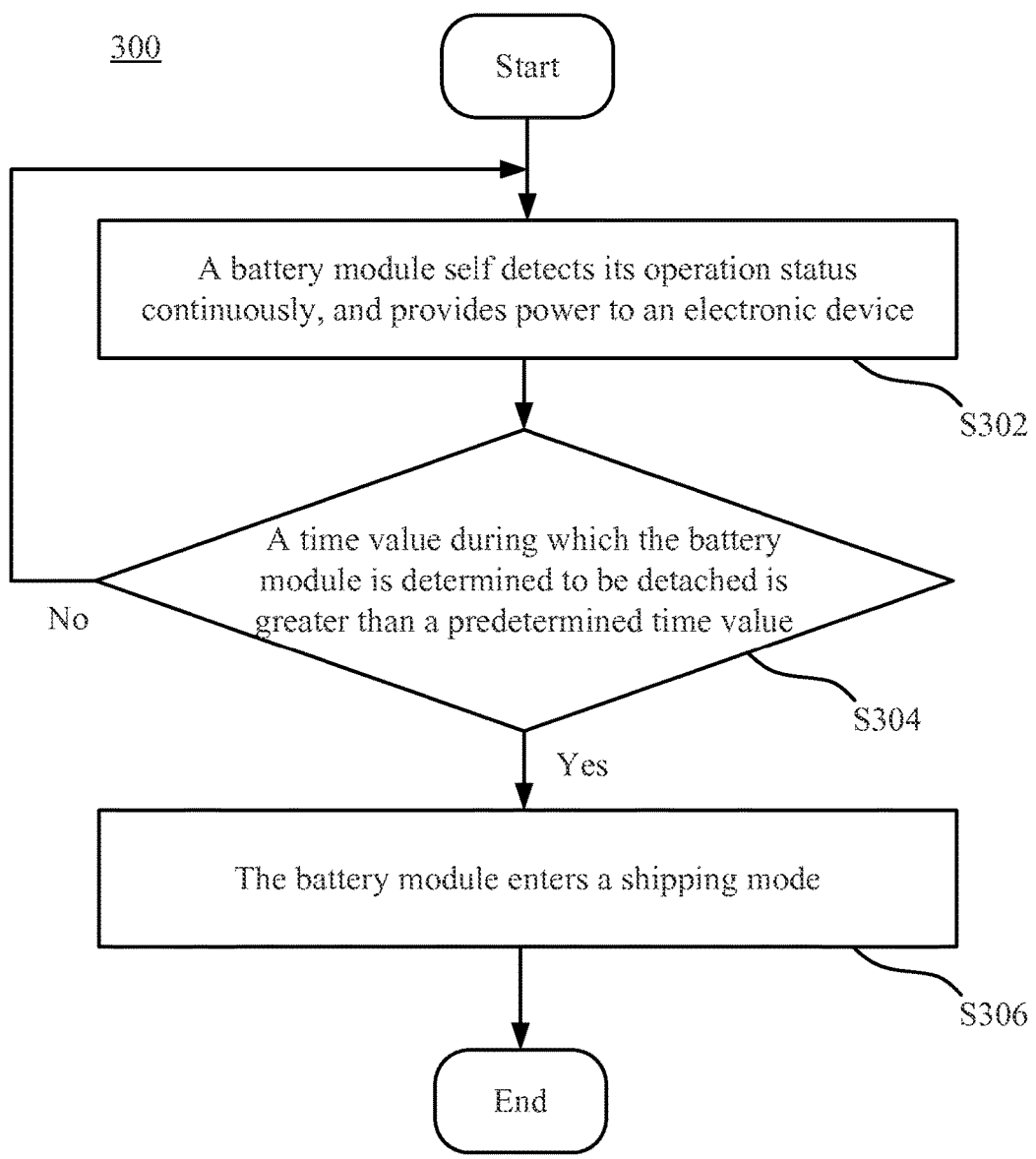
FIG. 3 is a flow chart of a battery safety method according to another embodiment of the present disclosure.

FIG. 3 is a flow chart of a battery safety method 300 according to another embodiment of the present disclosure. The battery safety method 300 includes steps S302-S306 and is applicable to the battery module 100 in FIG. 1. However, those skilled in the art should understand that the mentioned steps in the present embodiment are in an adjustable execution sequence according to the actual demands except for the steps in a specifically described sequence, and even the steps or parts of the steps can be executed simultaneously.

First, in step S302, a battery module self detects its operation status continuously, and provides power to an electronic device. For example, the self-detection includes detecting whether the battery module is detached from the electronic device. Conditions for determining whether the battery module is detached are described with details in the above embodiments, and are not repeated herein. In step S304, when a time value during which the battery module is determined to be detached is greater than a predetermined time value, then enters in step S306, the battery module enters a shipping mode. Otherwise, if, in step S304, it is determined that the battery module is not detached from the electronic device or the time value during which the battery module is determined to be detached is not greater than the predetermined time value, step S302 is performed repeatedly, in which the battery module continues to self detect its operation status and provides power to the electronic device.

In conclusion, the present disclosure can automatically enter a shipping mode which is power-saving and secure when a battery module of the present disclosure is detached from an electronic device, or can be designed to automatically enter the shipping mode after the battery module is detached from an electronic device for a predetermined period of time, so as to handle various application situations through the above-mentioned embodiments. Therefore, the battery module of the present disclosure can effectively prevent damage to the electronic device caused by surge or improper mounting, and also can improve leakage current problem. Therefore, operation safety and endurance of the battery module are improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A battery module, comprising:
at least one connection unit, configured to be detachably and electrically connected to an electronic device;
a determining unit, programmed to determine whether the battery module is detached from the electronic device through the at least one connection unit; when the determining unit determines that the battery module is detached from the electronic device, the determining unit controls the battery module to enter a shipping mode;
wherein after the battery module enters the shipping mode, the battery module stops outputting power, and the determining unit stops operation;
wherein when the battery module that enters the shipping mode is mounted on the electronic device, and the electronic device receives power through a power adapter unit, the determining unit releases the battery module from the shipping mode.

2. The battery module of claim 1, wherein the determining unit is programmed to determine whether the battery module is detached from the electronic device according to at least one electrical signal of the at least one connection unit.

3. The battery module of claim 1, wherein when the determining unit is programmed to determine that the battery module is detached from the electronic device, the determining unit starts to count a time value; and, when the time value is greater than a predetermined time value, the determining unit controls the battery module to enter the shipping mode.

4. A battery safety method, comprising:
determining whether a battery module is detached from an electronic device through at least one connection unit of the battery module, wherein the at least one connection unit is configured to be detachably and electrically connected to the electronic device;
controlling the battery module to enter a shipping mode when it is determined that the battery module is detached from the electronic device;
stopping the battery module from outputting power after the battery module enters the shipping mode; and
releasing the battery module from the shipping mode when the battery module that enters the shipping mode is mounted on the electronic device, and the electronic device receives power through a power adapter unit.

5. The battery safety method of claim 4, wherein determining whether the battery module is detached from the electronic device is performed according to at least one electrical signal of the at least one connection unit.

6. The battery safety method of claim 4, wherein controlling the battery module to enter the shipping mode when the battery module is determined to be detached from the electronic device comprises:
starting to count a time value when the battery module is determined to be detached from the electronic device; and controlling the battery module to enter the shipping mode when the time value is greater than a predetermined time value.

\* \* \* \* \*